Nov. 23, 1948.  H. E. THORNHILL  2,454,356
RING SEALED JOINT
Filed Oct. 13, 1945  2 Sheets-Sheet 1

Homer E. Thornhill
INVENTOR.
BY
ATTORNEYS

Nov. 23, 1948.    H. E. THORNHILL    2,454,356
RING SEALED JOINT

Filed Oct. 13, 1945    2 Sheets-Sheet 2

HOMER E. THORNHILL
INVENTOR.
BY J. Vincent Martin
and
Ralph R. Browning
ATTORNEYS Patented Nov. 23, 1948

2,454,356

UNITED STATES PATENT OFFICE 2,454,356

RING SEALED JOINT

Homer E. Thornhill, Houston, Tex.

Application October 13, 1945, Serial No. 622,176

9 Claims. (Cl. 285—122)

This invention relates to joints adapted to retain a fluid under pressure and has for its general object the provision of such a joint between two members, the joint having such a construction that pressure tending to force the members apart will produce a tighter seal and a more effective mechanical connection between them.

It is a well known fact that in connection with most joints adapted to interconnect members so as to form a pressure tight connection between them, the introduction of pressure within such members tends to render the seal between them less effective and tends to render the mechanical structure connecting the members subject to stresses and strains in direct proportion to the pressures being retained.

It is a more specific object of this invention to provide a structure in which the existence of pressure within the members connected by the structure of this invention will not only not tend to unseat the surfaces between which a seal is formed, but in which also those portions of the members which are joined together will be reinforced against the stresses of the pressure within the members, and much of the stress due to the pressure within the members will be transmitted from one member to the other without passing through that portion of the construction which normally holds the members together.

Another object is to provide a structure for efficiently joining together two tubular members.

Another object is to provide a structure of the type set forth in which the parts may easily align themselves with each other in the assembly of the structure.

Other objects and advantages of this invention will become apparent from the following description taken in connection with the accompanying drawing wherein one embodiment of this invention is illustrated by way of example.

Figure 1:
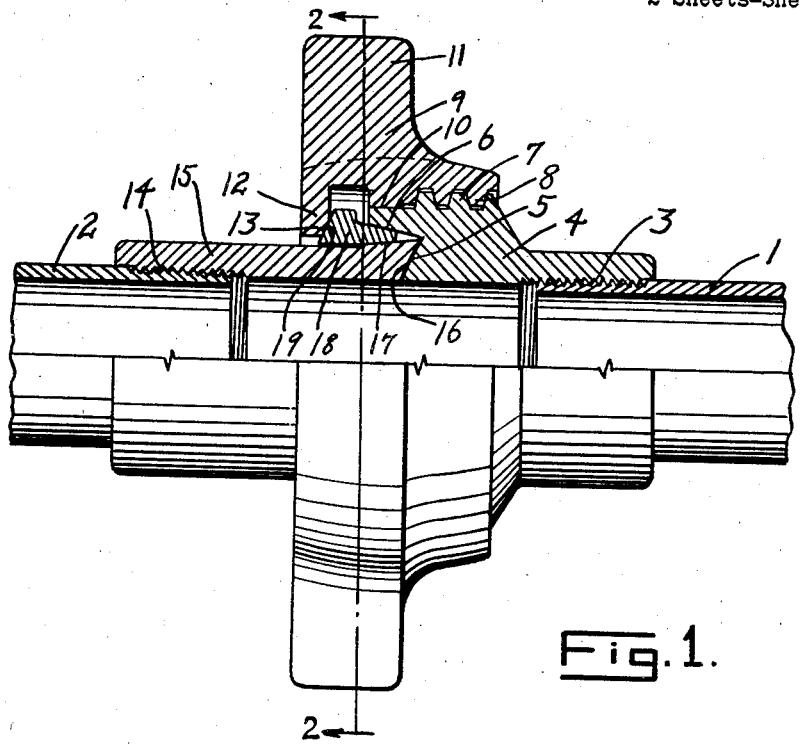
Fig. 1 is a view partly in side elevation and partly in longitudinal cross section illustrating a joint between two pipe sections, with the joint being constructed in accordance with this invention.

Referring now more particularly to the drawing, the numerals 1 and 2 indicate two pipe sections which are to be joined together by a structure made in accordance with this invention. Secured to one of the pipe sections by means of threads 3 is a part which might be termed a threaded hub 4. This hub actually forms one of the joint sections and is provided with a tapered seat 5 adapted to receive the opposite joint section in the manner presently to be described. This tapered seat 5 may be formed as a part of the surface of a sphere so that the two joint sections may rotate slightly with respect to each other to seat properly even though there may be a slight misalignment of the pipe sections 1 and 2. The seat 5 inclines away from the axis of the device in a direction toward the pipe section 1, and from its outer extremity the joint section 4 is provided with a conical ring seat 6 which flares outwardly away from the pipe section 1 to the end of the joint section 4.

On its exterior surface the joint section 4 is provided with threads 7 adapted to receive the threads 8 of a nut 9 by which the parts of the joint are held together as will be presently described. This nut 9 also has a cylindrical portion 10 which is directly opposite and in radial alignment with the ring seat 6 and adapted to closely contact a corresponding cylindrical portion on the exterior of the joint member 4 at that point when the parts are fully engaged with each other. The nut 9 is also provided with a pair of outwardly extending lugs 11 which may be referred to as hammer lugs and which are adapted to be struck with a hammer or the like in tightening or loosening the nut 9. The nut 9 also has an inwardly extending flange 12 at its end opposite the threads 8, this flange having a tapered seat 13 on its inner surface. The seat 13 may be formed as a section of a sphere and on a center substantially concentric with the surface 5 when the nut is fully engaged with the section 4.

Referring now to the opposite end of the joint, there is mounted upon the pipe section 2 by means of threads 14 a second joint section 15 having a flared end 16 adapted to seat against the seat 5 and having a corresponding spherical surface, and having a ring seat 17 adapted to be opposed to the ring seat 6 when the seats 5 and 16 are in contact with each other. The ring seats 6 and 17 form an opening with a V-shaped cross section between them, this opening tapering toward the pipe section 1.

Fitting into the V-shaped opening between the seats 6 and 17 is a sealing ring 18 having one edge shaped to fit the said V-shaped opening and having its opposite or shank edge formed with a surface 19 adapted to be engaged by and to fit the seat 13 on the flange 12 of the nut.

In operation, the joint sections 4 and 15 will of course first be threaded on to their respective pipe sections 1 and 2 with the nut 9 and the ring 18 already in place over the joint section 15. The two joint sections will then be brought together until the seats 5 and 16 are in engagement with each other, after which the ring 18 will be pressed into the V-shaped space between the seats 6 and 17 and the nut 9 will be threadedly engaged with the joint section 4. The spherical nature of the seats 5, 16, 13 and 19 will enable the parts properly to align themselves with each other, and the tightening of the nut 9 will force the ring 18 to firmly seat within the V-shaped space between the seats 6 and 17. Preferably this nut 9 will be tightened such an extent as to cause the ring 18 to form a seal with respect to the surfaces 6 and 17 and this may be accomplished by hammering against the lug 11. It is to be noted at this point that any tendency to spread the portion of the joint section 4 within which the ring 18 is seated is counteracted by the contact of the nut 9 about the circumference of the end portion of the joint section 4 at the location indicated by the numeral 10. Furthermore, any tendency of the member 15 to collapse due to the wedging action of the ring 18 will be counteracted by the engagement of the end of the member 15 with the flared shoulder 5.

If pressure now be introduced into the pipes 1 and 2 and within the joint, this pressure will, of course, tend to force the pipe sections 14 and 15 away from each other. The ring 18 being held in its groove and against movement with respect to the joint section 4 by means of the nut 9, any movement between the two joint sections would tend to move the joint section 15 with respect to the ring 18 and thus wedge the end portion of this joint section more tightly within the ring 18. This will of course tighten the contact between the seat 17 and the ring 18 and thus make the seal between these parts even tighter. At the same time, it will cause an expansion of the ring 18 so that it will more tightly engage with the seat 6 in the joint section 4. Thus the seal between the two joint sections formed by the ring 18 will become tighter as the pressure within the device increases.

Another point worthy of note is that as the ring 18 is expanded into tighter sealing engagement with the seat 6, it is also expanded into tighter frictional engagement with the seat 6, so that a portion of the force tending to separate the joint sections 4 and 15 will be transmitted through the ring 18 from one joint section directly to the other and the nut 9 will not be forced to stand the entire strain of holding the two joint sections together. Furthermore, a large portion of this force tending to separate the two joint sections will be translated into a radial force by virtue of the wedging engagement of the end of the joint section 15 within the ring 18, and this radial force will be transmitted through the edge portion of the joint section 4 to the surface 10 within the nut 9. The nut 9 will be strong enough to withstand the hoop tension thus introduced and will prevent a rupture of the parts.

Figure 2:
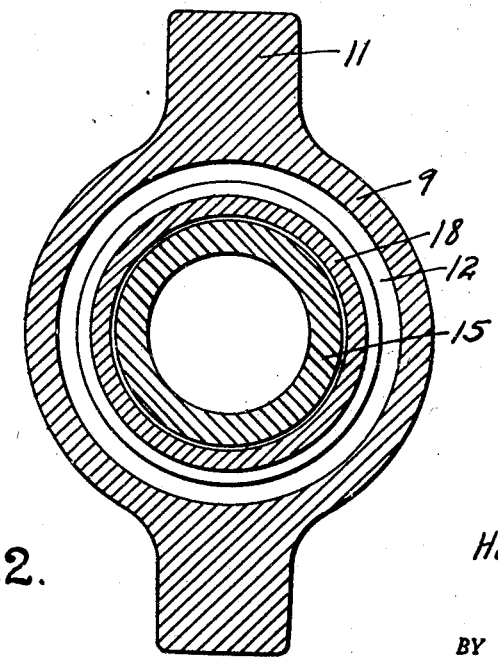
Fig. 2 is a transverse cross section through the same structure taken along the line 2—2 of Fig. 1.
Figure 3:
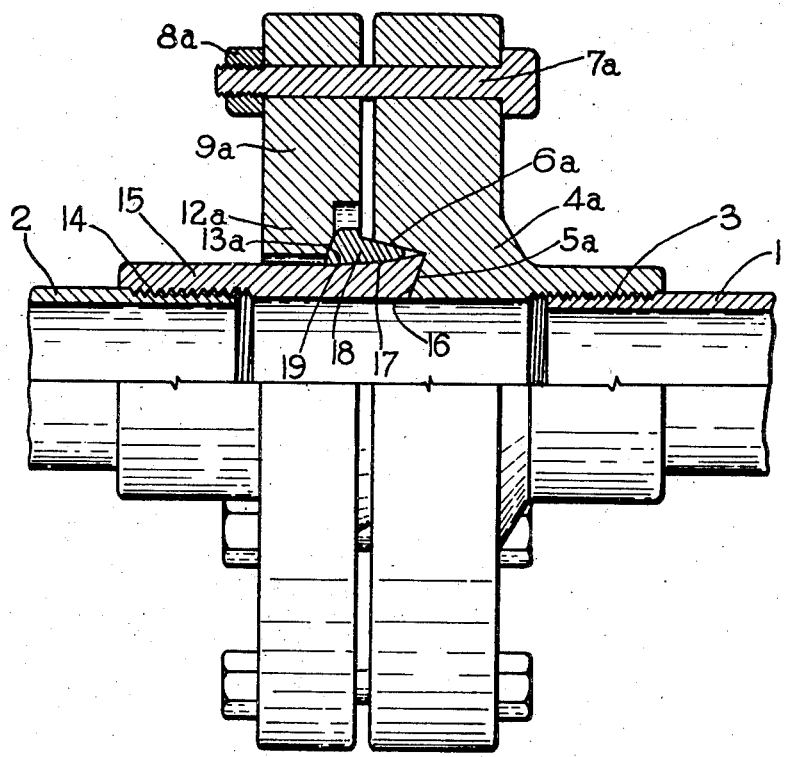
Fig. 3 is a view similar to Fig. 1 but showing a modification.

In the form illustrated in Fig. 3 the principles are much the same as those described in connection with Figs. 1 and 2. In this form, however, instead of the threaded joint member 4, there is connected to the pipe 1 by threads 3 a flanged joint member 4a. This flanged member has a tapered seat 5a substantially identical with the seat 5 in the element 4 in Fig. 1, and a tapered seat 6a substantially identical with the tapered seat 6 in the element 4 of Fig. 1. This flanged member, however, is not provided with anything corresponding to the threads 7 and 8, but instead of these threads which are employed in Fig. 1, there is provided a plurality of bolts 7a having nuts 8a thereon for securing the flanged member 4a to the flanged member 9a that is supplied in place of the element 9 of Fig. 1. This flanged member 9a has an inwardly extending lip or portion 12a corresponding to the portion 12 of the member 9 in Fig. 1, and a surface 13a corresponding to the surface 13 in Fig. 1 adapted to engage the surface 19 on the sealing ring 18, and when the bolts 7a and nuts 8a are tightened to draw this ring 18 into sealing position. Other than the use of the flanges connected by bolts 7a and 8a instead of the joint members connected by threads as indicated at 4 and 9 in Fig. 1, the two forms of the invention are identical in operation.

It will be appreciated also that other means of securing together members corresponding to the parts 4 and 9 of Fig. 1 may be employed and this invention is not intended to be limited to the exact forms illustrated.

It will be appreciated that a joint constructed in accordance with this invention may be employed for other purposes than for joining together two tubular members 1 and 2. For example, either of the joint sections 4 and 15 or both of them might be what are ordinarily referred to as blanks or closures and the nut 9 might take other forms capable of performing the function of a holding member for anchoring the sealing ring against movement away from one of the joint sections such as the section 4. Other modifications within the scope of the appended claims will likewise be apparent to persons skilled in the art.

From the foregoing it will be seen that a means has been provided which is capable of accomplishing all of the objects and advantages sought by this invention.

Having described my invention, I claim:

1. In a device of the character described, a tubular member having an opening therein with an open end, the inner surface of said opening having a flared zone and said member having a stop thereon, a tubular part adapted to enter said opening and abut said stop means and having a zone of its outer surface opposite said flared zone when said tubular part is in engagement with said stop means, said zone of said outer surface being tapered in a direction to provide a wedge-shaped space between it and said zone within the opening, annular means having a wedge-shaped cross section adapted to fit within said space, and means carried by said first tubular member for forcing said last mentioned means into said space and holding it therein.

2. In a device of the character described, a member having an opening therein with an open end, the inner surface of said opening having a flared zone and a shoulder of smaller diameter than the flared zone radially inwardly of the flared zone and itself flared in a direction away from the open end of the member, a part adapted to enter said opening past said flared zone and seat against said flared shoulder and having a zone of its outer surface opposite said flared zone when said part is seated against said shoulder, said zone of said outer surface being tapered in a direction to provide a wedge-shaped space between it and said flared zone within the opening, means having a wedge-shaped cross section adapted to fit into said space, and means for forcing said last mentioned means into said space and holding it therein.

3. In a device of the character described, a member having an opening therein with an open end, the inner surface of said opening having a flared zone and said member having a stop means thereon, a part adapted to enter said opening and abut said stop means and having a zone of its outer surface opposite said flared zone when said part is seated against said stop means, said zone of said outer surface being tapered in a direction to provide a wedge-shaped space between it and said flared zone within the opening, a radially expansible wedge means adapted to fit into said space, and means for forcing said last mentioned means into said space and holding it therein, said last mentioned means including a part threadedly engaging said member and having a portion embracing the exterior of said member about said flared zone to reinforce said member about said flared zone against radially outward stresses.

4. In a device of the character described, a member having an opening therein with an open end, the inner surface of said opening having a flared zone and said member having a stop thereon, a part adapted to enter said opening and seat against said stop and having a zone of its outer surface opposite said flared zone when said part is seated against said stop, said zone of said outer surface being tapered in a direction to provide a wedge-shaped space between it and said flared zone within the opening, and an annular wedge-shaped sealing means adapted to fit into said space, and means for forcing said last mentioned means into said space and holding it therein, said last means including means for reinforcing the member about said opening against outwardly radial stresses.

5. In a device of the character described, a member having an opening therein with an open end, the inner surface of said opening having a flared zone and said member having a stop thereon, a part adapted to enter said opening and seat against said stop and having a zone of its outer surface opposite said flared zone when said part is seated against said stop, said zone of said outer surface being tapered in a direction to provide a wedge-shaped space between it and said flared zone within the opening, and an annular wedge-shaped sealing means adapted to fit into said space, and means for forcing said last mentioned means into said space and holding it therein, said holding means comprising a ring threadedly engaging said first mentioned member and having a part tightly embracing the outer portion of said first mentioned member opposite said tapered zone to reinforce it against radially outward forces tending to expand it.

6. In a device of the character described, a member having an opening therein with an open end, the inner surface of said opening having a flared zone and said member having a spherical stop thereon, a part adapted to enter said opening and seat against said spherical stop and having a zone of its outer surface opposite said flared zone when said part is seated against said stop, said zone of said outer surface being tapered in a direction to provide a wedge-shaped space between it and said flared zone within the opening, an annular wedge-shaped sealing means adapted to fit into said space, and means for forcing said wedge-shaped sealing means into said space and holding it therein, the contact between said wedge-shaped sealing means and said last mentioned means being along a spherical surface substantially concentric with the spherical surface on said stop and said last mentioned means being anchored to said member when in holding position.

7. In a device of the character described, a member having an opening therein with an open end, the inner surface of said opening having a flared zone and said member having a stop thereon, a tubular part adapted to enter said opening and abut said stop means and having a zone of its outer surface opposite said flared zone when said tubular part is in enagagement with said stop means, said zone of said outer surface being tapered in a direction to provide a wedge-shaped space between it and said zone within the opening, annular means having a wedge-shaped cross section adapted to fit within said space, and means carried by said first tubular member for forcing said last mentioned means into said space and holding it therein, said last mentioned means including a flange and bolts securing said flange to said first tubular member and engaging said annular means to move it into said wedge-shaped space.

8. In a device of the character described having an open ended member, the member having a flared inner surface with a tapered stop portion radially inwardly therefrom, a tubular part adapted to fit within the flared portion and abut the stop and having an external surface oppositely flared relative to the flared portion of the open ended member and locking means for securing the tubular part within the open ended member including an annular wedge and an abutting element releaseably anchored to the open ended member, said element holding the wedge within the space between the flared surfaces of the tubular part and open ended member, the abutting surfaces between the element and wedge and between the tubular part and member being portions of concentric spheres whereby a ball and socket type union is provided to facilitate assembly of the joint parts in seated engagement.

9. In a coupling device an open-ended member having oppositely flared confronting, concentric surfaces at one opening providing a groove therebetween, the inner one of these surfaces terminating well within the member relative to the outer one, said inner surface providing a stop for a tubular part having an inwardly bevelled abutment surface for engagement with the stop, said tubular part also having an outer flared periphery at the abutment end, this flared periphery and the outer flared surface of the member providing a groove wedge-shaped in cross-section, an annular wedge residing in the latter groove and an element releasably anchored to the open-ended member abutting the wedge and holding it firmly in wedging position within the groove.

HOMER E. THORNHILL.

REFERENCES CITED

The following references are of record in the file of this patent:

UNITED STATES PATENTS

| Number | Name | Date |
|---|---|---|
| 1,743,922 | Kirlin | Jan. 14, 1930 |
| 2,009,650 | Claussen | July 30, 1935 |
| 2,179,127 | Lauer | Nov. 7, 1939 |
| 2,326,929 | Cowles | Aug. 17, 1943 |